United States Patent
Kenney et al.

(10) Patent No.: US 11,632,724 B1
(45) Date of Patent: Apr. 18, 2023

(54) PROACTIVE POWER AND RATE CONTROL ALGORITHM FOR DYNAMIC PLATFORMS IN A MESH NETWORK

(71) Applicant: L3Harris Technologies, Inc., Melbourne, FL (US)

(72) Inventors: Brent A. Kenney, Bountiful, UT (US); Patrick L. Newbold, Draper, UT (US); James E. Peterson, Hyrum, UT (US); Matthew J. Reimann, Draper, UT (US); Philip M. Hirz, Holladay, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 17/494,392

(22) Filed: Oct. 5, 2021

(51) Int. Cl.
*H04B 17/336* (2015.01)
*H04W 52/28* (2009.01)
*H04W 52/24* (2009.01)
*H04W 84/18* (2009.01)

(52) U.S. Cl.
CPC ........ *H04W 52/283* (2013.01); *H04B 17/336* (2015.01); *H04W 52/241* (2013.01); *H04W 84/18* (2013.01)

(58) Field of Classification Search
CPC . H04W 52/283; H04W 52/241; H04W 84/18; H04B 17/336
See application file for complete search history.

(56) References Cited

U.S. PATENT DOCUMENTS

| | | | |
|---|---|---|---|
| 8,908,559 B1 * | 12/2014 | Chhabra | H04W 48/20 370/252 |
| 9,621,850 B1 * | 4/2017 | Mitchell | H04B 7/18508 |
| 9,907,147 B2 * | 2/2018 | Chen | F21V 14/06 |
| 10,368,318 B2 * | 7/2019 | Lo | H04W 52/262 |
| 10,499,477 B2 * | 12/2019 | Chen | H05B 47/12 |
| 10,514,709 B2 * | 12/2019 | Shattil | B64C 39/024 |
| 10,582,593 B2 * | 3/2020 | Chen | F21V 14/04 |
| 10,790,898 B1 * | 9/2020 | Bar-Sade | H01Q 1/246 |
| 10,866,596 B1 * | 12/2020 | Shattil | H04B 7/024 |
| 11,026,317 B2 * | 6/2021 | Chen | F21S 8/086 |
| 2004/0095907 A1 * | 5/2004 | Agee | H04B 7/10 370/400 |
| 2007/0238480 A1 * | 10/2007 | Lin | H04W 52/241 455/69 |
| 2010/0142447 A1 * | 6/2010 | Schlicht | H04W 4/20 370/328 |

(Continued)

OTHER PUBLICATIONS

European Search Report received for European Patent Application No. 22199760.4, dated Feb. 17, 2023, 8 pages.

*Primary Examiner* — Hai V Nguyen
(74) *Attorney, Agent, or Firm* — Workman Nydegger (57) ABSTRACT

Compensating for antenna gain losses due to attitude changes of a mobile local node in a network. A method includes at the local node, identifying an attitude change of the local node. As a result of identifying the attitude change of the local node, the method includes increasing a target SNR of forward data directed to one or more remote nodes by a boost value. As a result of identifying the attitude change of the local node, the method includes causing the remote node to adjust at least one of power or rate to compensate for the attitude change for subsequent reverse data sent from the remote node to the local node.

21 Claims, 6 Drawing Sheets

(56) References Cited

U.S. PATENT DOCUMENTS

| | | | |
|---|---|---|---|
| 2010/0142448 A1* | 6/2010 | Schlicht | H04W 28/021 370/328 |
| 2011/0142108 A1* | 6/2011 | Agee | H04W 24/02 375/219 |
| 2012/0143383 A1* | 6/2012 | Cooperrider | H05B 47/175 700/295 |
| 2012/0170514 A1* | 7/2012 | Lo | H04W 52/262 370/328 |
| 2016/0286627 A1* | 9/2016 | Chen | H05B 47/19 |
| 2016/0286629 A1* | 9/2016 | Chen | H05B 47/19 |
| 2018/0192349 A1* | 7/2018 | Agee | H04L 27/2627 |
| 2018/0279133 A1* | 9/2018 | Gayrard | H04W 48/06 |
| 2018/0295589 A1* | 10/2018 | Emmanuel | H04W 72/0473 |
| 2018/0375567 A1* | 12/2018 | Fan | H04B 7/2606 |
| 2019/0115974 A1* | 4/2019 | Frolov | H01Q 1/125 |
| 2019/0140340 A1* | 5/2019 | Ramasamy | H01Q 1/2291 |
| 2019/0206267 A1* | 7/2019 | Taveira | B64C 27/20 |
| 2019/0215934 A1* | 7/2019 | Chen | F21V 13/04 |
| 2020/0029771 A1* | 1/2020 | Mellinger, III | A47L 11/4011 |
| 2020/0029772 A1* | 1/2020 | Mellinger, III | A47L 9/2815 |
| 2020/0045642 A1 | 2/2020 | Wang | |
| 2020/0053857 A1* | 2/2020 | Chen | H05B 45/20 |
| 2020/0106518 A1* | 4/2020 | Frolov | G01S 1/02 |
| 2020/0146132 A1* | 5/2020 | Chen | F21V 21/22 |
| 2021/0134162 A1* | 5/2021 | Sundaramurthy | B64D 43/00 |
| 2021/0242935 A1 | 8/2021 | Sakhnini et al. | |
| 2021/0329756 A1* | 10/2021 | Chen | H05B 45/10 |
| 2021/0336797 A1* | 10/2021 | Van Duren | H04L 9/3247 |
| 2021/0373581 A1* | 12/2021 | Shattil | H04B 7/024 |
| 2022/0189320 A1* | 6/2022 | Melodia | H04W 4/44 |
| 2022/0209848 A1* | 6/2022 | Omote | H04B 7/18504 |
| 2022/0272084 A1* | 8/2022 | Hyatt | H04W 4/025 |
| 2022/0326757 A1* | 10/2022 | Sydir | G06F 1/3296 |

* cited by examiner

PROACTIVE POWER AND RATE CONTROL ALGORITHM FOR DYNAMIC PLATFORMS IN A MESH NETWORK

BACKGROUND

This invention was made with government support under Contract Number: NR0000-17-C-0229 awarded by National Reconnaissance Office. The government has certain rights in the invention.

Computing system functionality can be enhanced by a computing system's ability to be interconnected to other computing systems via network connections. The connections allow a computing system to access services at other computing systems and to quickly and efficiently receive data from other computing systems.

Some computing systems communicate using ad-hoc mesh networks, which are typically wireless decentralized networks where the various nodes in the mesh network communicate with neighbor nodes in the network. One example of such a network is a code division multiple access (CDMA) mobile ad-hoc network (MANET). Often, these mesh networks are composed of at least some mobile platforms deployed in an environment (note that some platforms may be static) where the mobile platforms need to communicate with each other. For example, such platforms may be encountered in battlefield environments where individual soldiers, ground vehicles, aircraft, watercraft, satellites and the like need to communicate with each other.

Nodes in these networks have the ability to control the transmit power and rate at which communications are transmitted to attempt to achieve a target signal to noise ratio (SNR) at a receiver node. This power and rate control is often facilitated by using feedback messages from receiver nodes to transmitter nodes indicating actual measured SNR of received signals. This feedback can be used by a transmitter node, which also knows the power and rate at which the original signals were transmitted, to make decisions about increasing and/or decreasing power and/or rate of transmitted signals to achieve a target SNR at the receiver node. Thus, there is a latency between when a transmitter node sends a signal to a receiver node, when the receiver node replies with feedback indicating the SNR of the signal, and when the transmitter node can adjust power and/or rate to attempt to achieve the target SNR.

However, conditions in certain environments may result in antenna gain losses, which affect the SNR at receiver nodes, where the antenna gain losses occur very rapidly, and indeed sufficiently rapid that a link can be lost between nodes before the target SNR can be increased to prevent loss of the link. For example, consider the case when the nodes are included as part of fighter jet aircraft. In this example, the attitude (i.e., combination of pitch, roll, and to some extent heading) can change rapidly which also causes an equally rapid change in orientation of antenna gain patterns. That is, analysis of antenna patterns on fighter jet platforms shows that average antenna gain changes rapidly when pitch and roll (and to a lesser extent attitude heading) change rapidly. In current power and rate control algorithms, a transmitter node must transmit at a certain gain value, and receive feedback messages from the receiver node sufficiently fast to prevent losing communication locks between the transmitter and receiver nodes. Further, this problem is exacerbated when there are multiple nodes in a mesh network that may have different power and rate update rates and experience different changes in antenna gain due to their position relative to a transmitter node.

Some systems have attempted to compensate for this by intentionally transmitting at power levels that exceed the necessary power levels to accomplish node to node communication with the intent that sudden gain changes will not affect maintaining the channel if sufficient gain headroom is used. However, this is not without certain drawbacks. In particular, nodes in a CDMA network that operate at a higher power level than needed increase CDMA interference, which reduces network capacity. In addition, many such systems attempt to implement communications that have low probability of interception (LPI), low probability of detection (LPD), and/or low probability of geolocation (LPG). This is typically accomplished by limiting the transmit power to prevent adversarial entities from intercepting, detecting, or geo-locating the signal.

Thus, it would be useful to implement a system where power and rate of transmitted signals can be changed with sufficient speed to compensate for the changing antenna gain patterns caused by sudden changes in aircraft attitude without resorting to excessively high transmit power levels.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a network environment, where one or more nodes in the network comprise mobile nodes. The method includes acts for compensating for antenna gain losses due to attitude changes of a local node. The method includes at the local node, identifying an attitude change of the local node. As a result of identifying the attitude change of the local node, the method includes increasing a target SNR of forward data directed to one or more remote nodes by a boost value. As a result of identifying the attitude change of the local node, the method further includes causing the remote node to adjust at least one of power or rate to compensate for the attitude change, for subsequent reverse data sent from the remote node to the local node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein implement a proactive power and rate (PAR) control process which uses platform attitude orientation measurements (e.g. pitch and/or roll angles, and/or to a lesser extent heading angles) to boost link SNR margin on a forward (i.e. transmit) and reverse (i.e. receive) side of a wireless communication link to compensate for antenna gain losses due to the attitude changes. In particular, embodiments use platform orientation angles, as determined by system hardware, such as an inertial navigation system (INS), to add link margin by (1) at a local node, increasing the targeted operating transmit SNR for other remote nodes, thus affecting the forward path, and (2) causing a remote node to adjust at least one of power or rate to compensate for the attitude change by adding link margin with respect to the local node. This can be accomplished, for example, by diminishing measured SNR from other connected remote nodes where the diminished measured SNR is then fed back to those nodes, thus affecting the reverse path by causing those remote nodes to adjust at least one of power or rate. In some embodiments, this is done to attempt to maintain target SNRs of the remote nodes with respect to the local node. In an alternative embodiment, the local node could request that remote nodes increase their target SNR values with respect to the local node, as a result of an attitude change.

In the following examples, communication hardware such as various transmitters, receivers, antennas, and the like are used to transmit and receive data and the various messages illustrated. The antennas have various gain patterns that change with changes in attitude of mobile platforms.

Figure 1A:
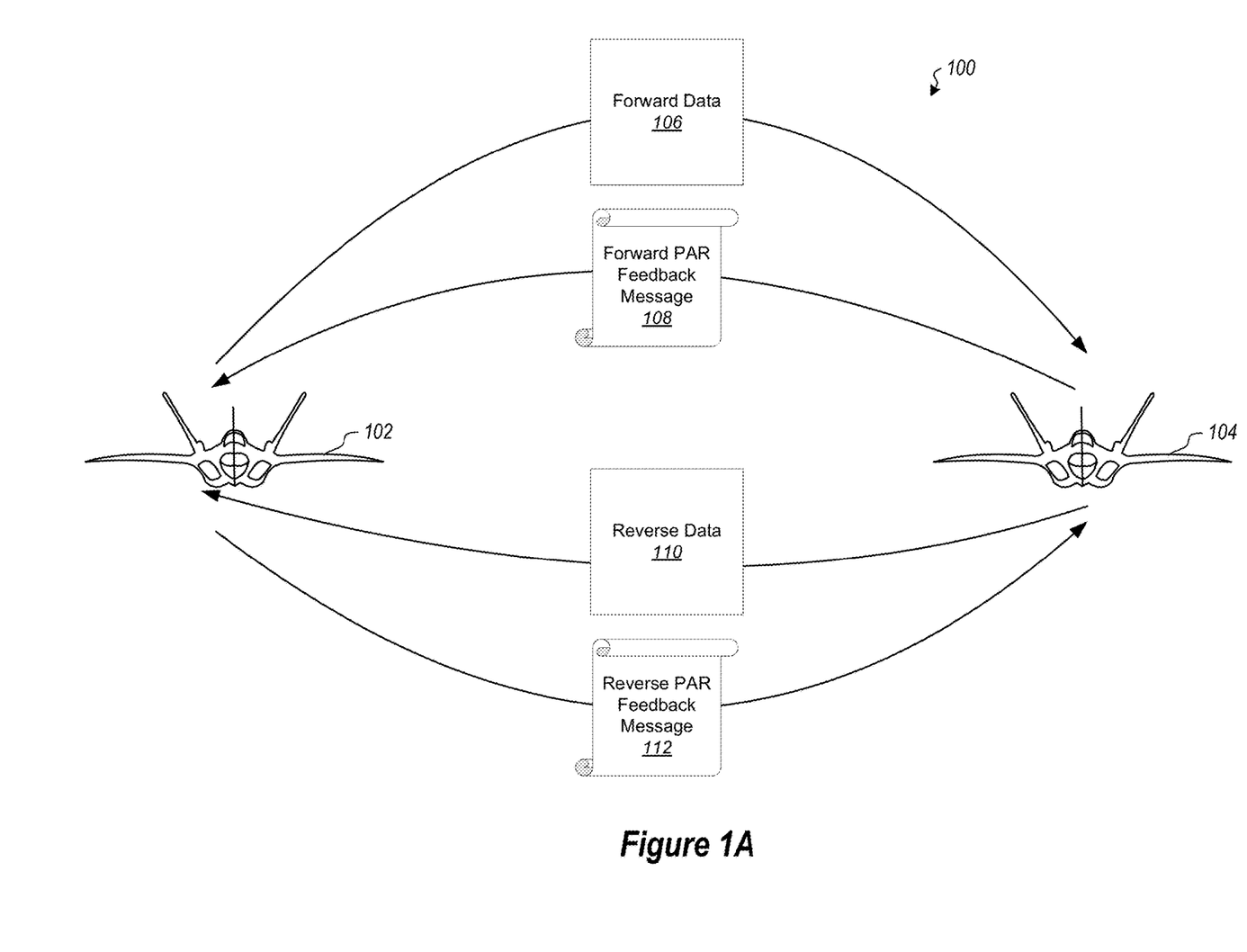
FIG. 1A illustrates a mesh network including two mobile nodes.

Additional details are now illustrated. FIG. 1A illustrates two nodes (although it should be appreciated that multiple nodes may be implemented in any given scenario). In particular, a local node 102 and remote node 104 are illustrated. In this example, the nodes 102 and 104 are implemented as aircraft, although in other embodiments, watercraft, satellites, or certain other vehicles may be implemented.

In FIG. 1A, the nodes are operating in a 'normal' operation mode where target SNR (and thus, transmit power and rate) are determined by a transmitting node using feedback from a receiving node from previous messages, but not increasing the target SNR at the remote node 104 due to an attitude change. Further, normal mode includes the local node 102 sending PAR feedback messages based on SNR measured for data messages received from the remote node 104 without diminishing the SNR measurement value in feedback messages provided to the remote node 104 due to attitude changes of the local node 102. Note that the local node and remote node may each act as transmitter and/or receiver at various times, and both nodes can include similar functionality. Further, a local node may communicate with multiple remote nodes at any given time.

The nodes can operate in normal mode when feedback latency will not adversely affect the channel between the nodes 102 and 104, within some predetermined threshold. This typically occurs when there are no attitude changes, only small attitude changes of a given node, or when attitude changes occur at a slow enough rate that feedback indicating channel degradation is occurring can be received from the remote node with sufficient time to correct for the channel degradation without serious adverse effects (such as losing the link) to the channel.

In particular, FIG. 1A illustrates that the local node 102 sends forward data 106 on a forward channel to the remote node 104. The local node 102 knows the power and rate at which the forward data 106 is sent to the remote node 104. The remote node 104 accumulates SNR information, typically expressed as $E_b/N_0$, where $E_b$ is the energy per bit and No is the noise power spectral density. The remote node 104 provides a forward PAR feedback message 108 to the local node 102 indicating the SNR measured at the remote node 104. Given that the local node 102 wishes to maintain a particular SNR, i.e. a target SNR, at the remote node 104, the local node 102 can adjust power and rate at the local node 102 for subsequent data transmitted to the remote node 104. This can be in the form of power and/or rate adjustments. Increasing power tends to increase the SNR at the remote node 104, decreasing rate tends to increase the SNR at the remote node 104, decreasing power tends to decrease the SNR at the remote node 104, and increasing rate tends to decrease the SNR at the remote node 104.

Note that the remote node 104 functions in a similar fashion to the local node 102. That is, the remote node 104 sends reverse data 110 on a reverse channel to the local node 102. The remote node 104 knows the power and rate at which the reverse data 110 is sent to the local node 102. The local node 102 accumulates SNR information with respect to data received from the remote node 104. Accordingly, the local node 102 sends reverse PAR feedback message 112 to the remote node 104 indicating the measured SNR of the reverse data 110 at the local node 102. The remote node 104 can then increase or decrease power and/or rate in a similar fashion as previously described to attempt to achieve a target SNR at the local node 102.

Note that as discussed previously, there are various reasons to limit power of data transmissions in both the forward channel and the reverse channel. In particular, limiting power in a CDMA network reduces CDMA interference, which improves overall network performance. In addition, it may be useful to limit power so as to implement low probability of interception, low probability of detection, and low probability of geolocation signals to prevent adversarial entities from intercepting communications and using those communications to discover sensitive information and/or identify locations of particular nodes in a mesh network 100.

As discussed previously, changes in attitude of the local node can occur at a rate that may cause disruption of the channel between the local node 102 and 104 inasmuch as the remote node 104 will not be able to provide feedback at a sufficient rate to prevent channel disruption. For example, a banking maneuver that transitions from a 0° to 45° bank may cut the gain of the signal in about one fourth resulting in loss of communication that may last for the entire length of a turn. For example, and with reference to FIG. 1B, the local node 102 may change its attitude, shown as a 45° change in roll over a short period of time, where an antenna output pattern, and thus gain, changes with respect to the remote node 104. If the local node is transmitting forward data 106 at a certain power and rate and that power and rate is insufficient to provide recoverable data to the remote node 104 due to the change in attitude, then the remote node 104 will not receive the forward data 106 on the forward channel and thus will not have any measured data to report due to the lost signal. This will cause a loss of the link between the local node 102 and the remote node 104.

Figure 1B:
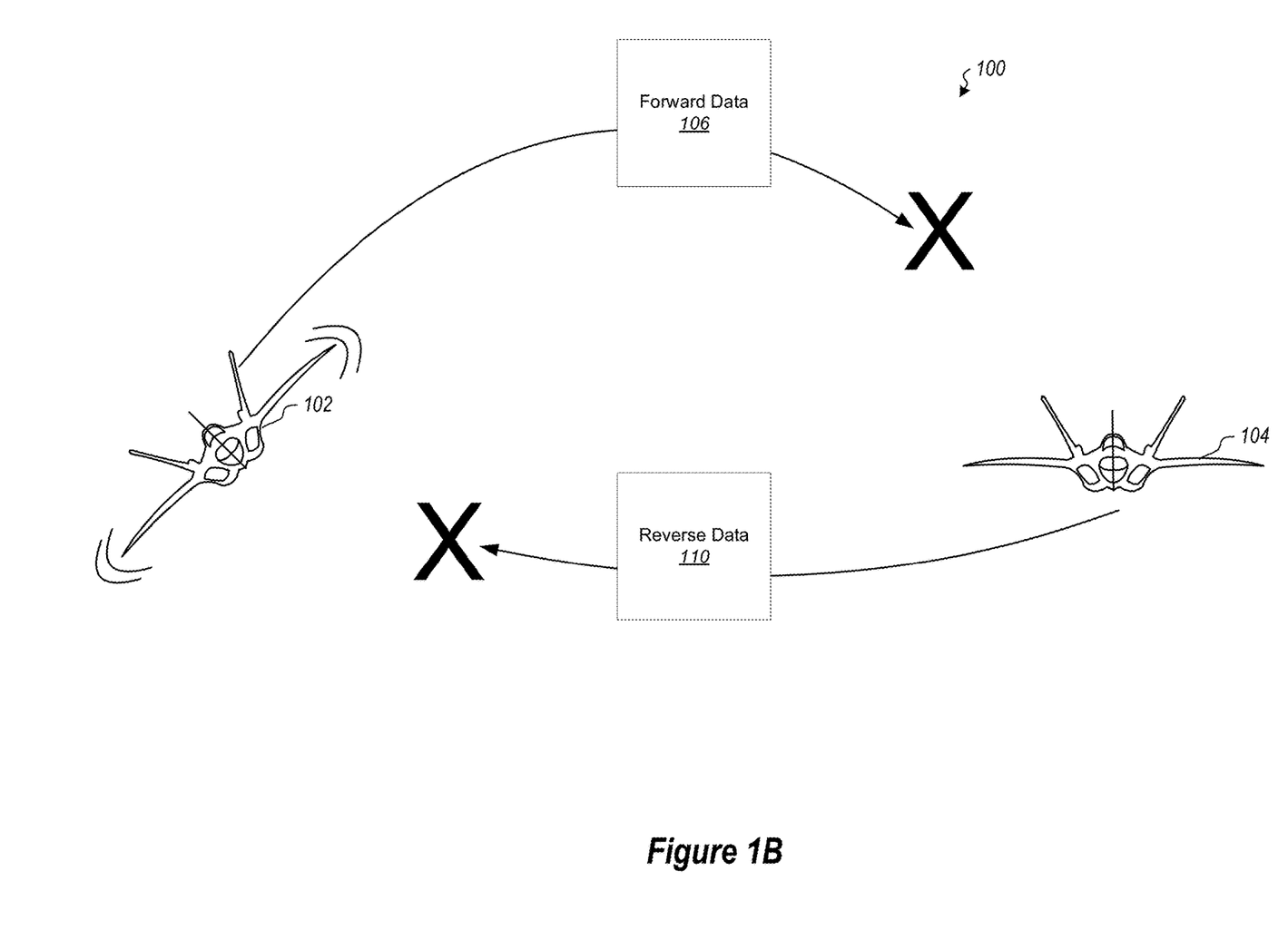
FIG. 1B illustrates the mesh network with one of the nodes undergoing a change in attitude where the link is lost.

Similarly, if the remote node 104 is attempting to send reverse data 110 to the local node 102 and is not aware of the change in attitude of the local node 102, the reverse data 110 may not be transmitted at a sufficient power and rate to be recoverable by the local node 102 as illustrated in FIG. 1B.

Thus, embodiments illustrated herein implement functionality for causing the local node 102 to increase power and/or decrease rate to boost link margin as a result of the change in attitude, without needing the forward PAR feedback message 108 to cause the change. Similarly, embodiments can cause the remote node 104 to increase its power and/or decrease its rate as a result of the change in attitude of the local node 102.

In particular, this is done using a multifaceted approach including at least two actions. In a first action, the local node 102 automatically increases the target SNR to the remote node 104 to increase link margin by raising the power and/or decreasing the rate of the forward data 106 based on the rate of attitude change of the local node 102. In particular, the local node 102 will attempt to increase the SNR at the remote node 104 at a magnitude that is a factor of the change in the attitude of the local node 102. Thus, the faster the change in attitude of the local node 102, the larger the magnitude of change in increasing target SNR for the forward data 106.

Note that these corrections are typically performed when an aircraft enters into, or exits out of a banking turn. During and/or after the turn itself, there may be sufficient feedback to control transmission using the normal mode operation.

Figure 2A:
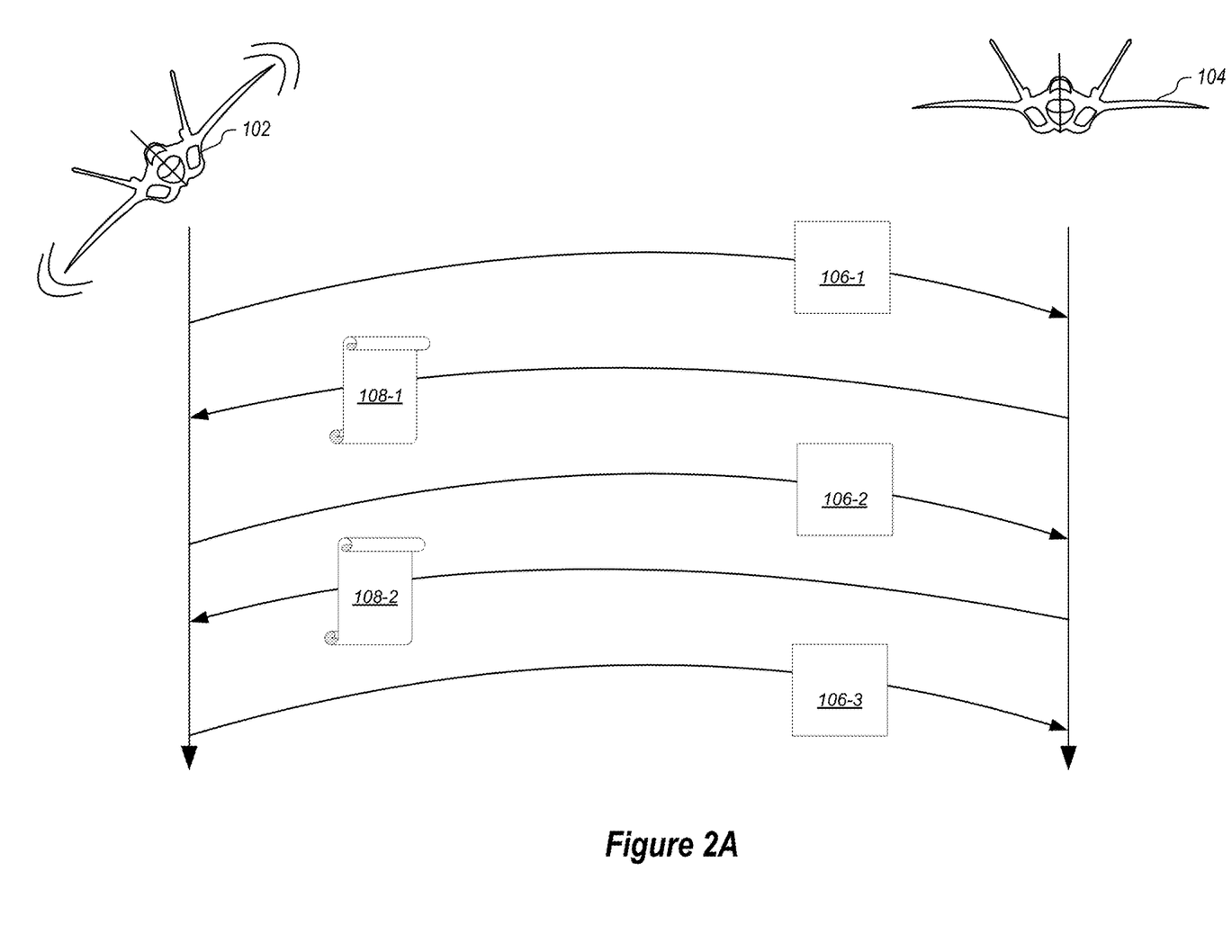
FIG. 2A illustrates a detailed data exchange between the two nodes during the attitude change.

Additional details are now illustrated with reference to FIG. 2A. In this example, the forward data 106 illustrated in FIG. 1A is subdivided into different PAR intervals having different target SNR's for the remote node 104. FIG. 2A illustrates forward data 106-1 for a first PAR interval is sent from the local node 102 to the remote node 104. The first PAR interval in this example occurs during normal operation of the forward channel. In response to the forward data 106-1, the reverse node sends a forward PAR feedback message 108-1 reflecting measured SNR at the remote node 104 for the forward data 106-1.

Figure 1C:
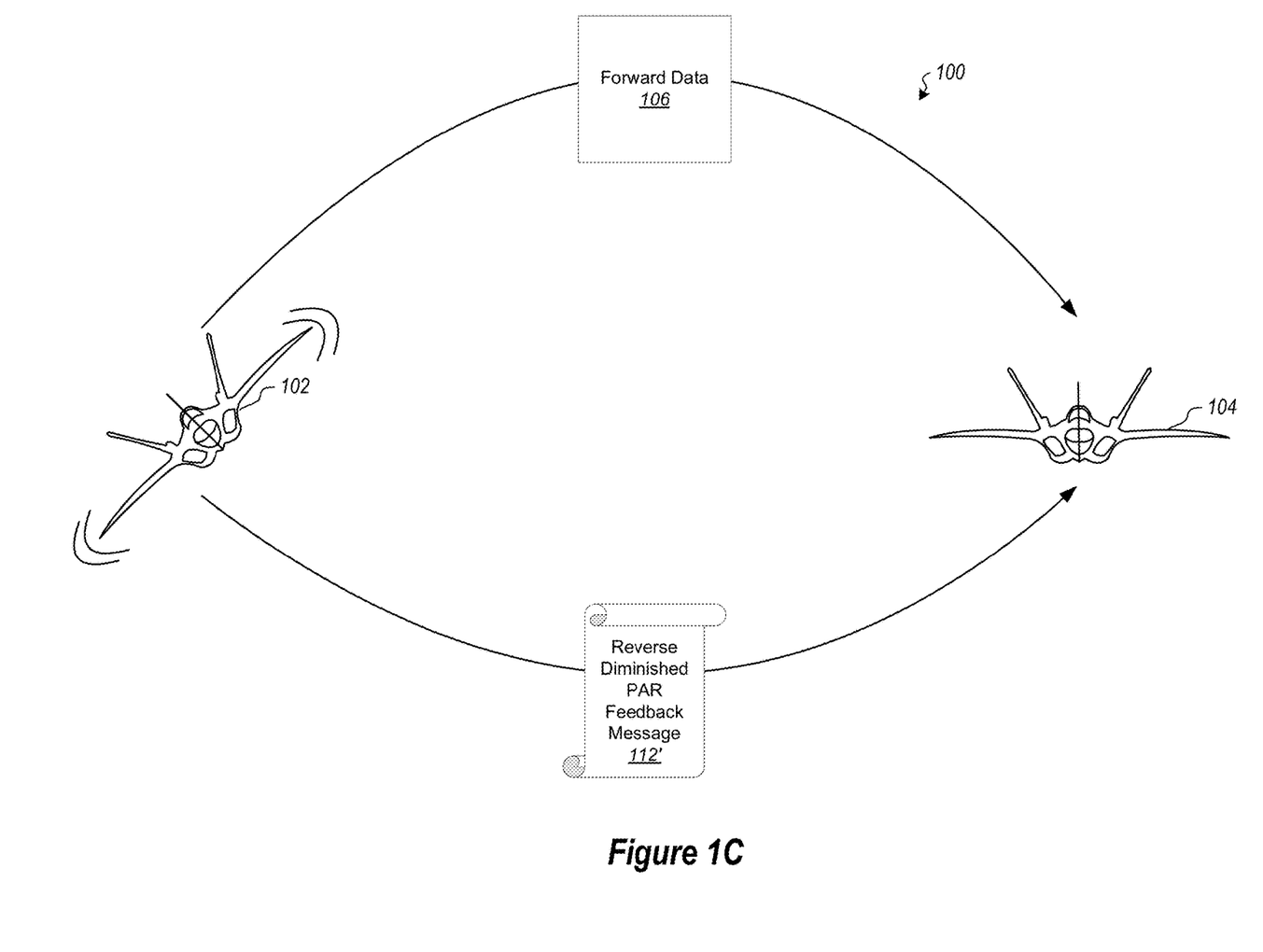
FIG. 1C illustrates the mesh network with one of the nodes undergoing a change in attitude with increased target SNR for forward data and diminished PAR feedback to compensate for the change in attitude.

FIG. 2A further illustrates forward data 106-2 being sent during a second PAR interval, where in this case, the second PAR interval is occurring while the local node 102 performs a change in attitude such as is illustrated in FIG. 1C. Thus, the local node 102 will send the forward data 106-2 at a power and rate selected to increase the signal in the forward channel to compensate for gain losses caused by the change in attitude.

The amount of compensation may be variable dependent on the nature of the change in attitude. For example, in some embodiments, the compensation may be linear such as by increasing output gain by 0.15 dB per degree angle change. Alternatively, the compensation may be step based such as by increasing output gain by 1.5 dB for each 10° or portion thereof of angle change. Alternatively or additionally, the compensation may be based on a starting absolute angle and ending absolute angle. For example, more compensation will likely be needed when changing from a 45° attitude to a 90° attitude than from a 0° attitude to a 45° attitude. Note also that the compensation may be different depending on the number of axes experiencing a change in attitude. For example, while the example illustrated in FIG. 1C illustrates a change in roll, it should be appreciated that in other embodiments a change in pitch and/or a change in roll may occur. Note that typically changes in heading, in some embodiments, can be ignored inasmuch as heading can rarely be changed at a sufficient rate to cause the deleterious effects described previously herein. However, in embodiments where heading can be changed at a sufficient rate to cause deleterious effects, those changes in heading can also be factored into determining the magnitude of compensation for changes in attitude. In some embodiments, the change in attitude may be a factor of the change in pitch added to a factor of the change in roll, and potentially added to a factor of the change in heading. E.g., change in attitude may equal X(change in pitch)+Y(change in roll)+Z(change in heading), where X, Y, and Z are the factors respectively. In some embodiments, the factors for pitch and roll are the same, and indeed may simply have a value of '1'.

As a result of receiving the forward data 106-2, the remote node 104 will accumulate SNR and report that SNR in a PAR forward feedback message 108-2.

At this point, the local node 102 may be no longer performing rapid changes in attitude, and thus can send additional forward data 106-3 in a third PAR interval as illustrated. That is, the local node 102 can return to normal operation by not compensating for antenna gain losses caused by rapid changes in attitude. In some embodiments, this only happens after, and as a result of, the local node 102 receiving the feedback 108-2, indicating that the remote node 104 has successfully received the signal at the new attitude.

Returning once again to FIG. 1C, in conjunction with the first action, the local node 102 performs an additional second action to cause the remote node to adjust at least one of power or rate to compensate for the change in attitude for reverse data sent from the remote node to the local node. In some embodiments, this includes sending a reverse diminished PAR feedback message 112'. The reverse diminished PAR feedback message 112' is sent and includes SNR feedback that is based on an operation that diminishes the actual measured value of SNR from previous reverse data 110 by a diminishing value. That is, the local node 102 will measure SNR due to reverse data 110, but instead of reporting the actual SNR value, the measured SNR value will be diminished by some amount (referred to herein as a diminishing value) dependent on the nature of the change in attitude of the local node 102. The measured SNR value minus the diminishing value will be reported in the reverse diminished PAR feedback message 112' as the measured SNR at the local node 102. In some embodiments, the diminishing value is the same as the amount that target SNR is increased in the forward channel. Thus, for example, if the target SNR is increased by 3 dB, the measured SNR will be diminished by a 3 dB diminishing value and the diminished SNR will be reported as the measured SNR to the remote node 104.

In an alternative embodiment, the local node 102 may send a message to the remote node 104 requesting that the remote node 104 increase its target SNR with respect to the local node. In some embodiments, the local node 102 will request that the remote node 104 increase its target SNR by the same amount that the local node 102 increases its target SNR with respect to the remote node 104.

Figure 2B:
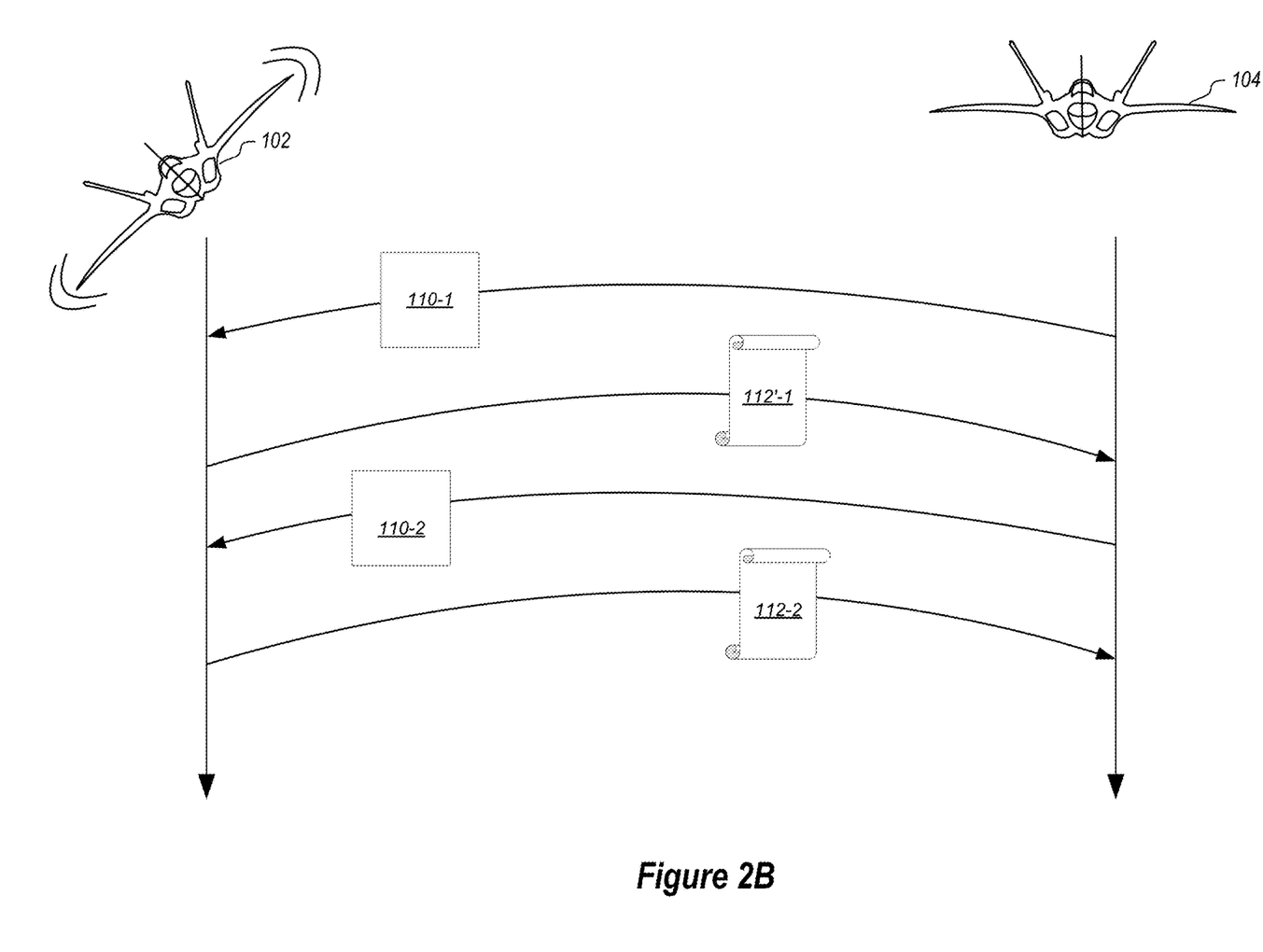
FIG. 2B illustrates another detailed data exchange between the two nodes during the attitude change.

A more detailed example is now illustrated with reference to FIG. 2B. As with the example illustrated in FIG. 2A, different PAR intervals are shown. In a first PAR interval, the remote node 104 sends reverse data 110-1 to the local node 102. The local node 102 accumulates SNR based on the reverse data 110-1 sent during the first PAR interval. However, the local node 102 diminishes the measured SNR by some amount determined based on the nature of the attitude change of the local node 102. Note that the reverse data 110-1 will typically be received prior to the local node 102 initiating the attitude change. The diminished SNR is then sent in a return diminished PAR feedback message 112'-1. The remote node 104 will adjust power and/or rate for data sent to the local node on the reverse channel based on the reported SNR in the return diminished PAR feedback message 112'-1. In particular, the remote node 104 will raise the power and/or lower the rate for subsequent reverse data sent to the local node 102 based on an assessment that the reverse channel is being degraded due to the information included in the return diminished PAR feedback message 112'-1.

This results in the remote node 104 sending the reverse data 110-2 in a second PAR interval at an increased power and/or decreased rate based on the information included in the return diminished PAR feedback message 112'-1 to attempt to maintain a previous SNR. As illustrated in FIG. 2B, if the local node 102 is no longer performing rapid attitude changes, in response to the reverse data 110-2, the local node can accumulate SNR for the reverse data 110-2 and construct reverse PAR feedback message 112-2 in a normal operational mode where the accumulated SNR has not been diminished.

The amount of diminishing may be variable dependent on the nature of the change in attitude. For example, in some embodiments, the compensation may be linear such as by diminishing measured SNR by 0.15 dB per degree angle change. Alternatively, or additionally the compensation may be full or partial step based such as by diminishing SNR by 1.5 dB for each 10° or portion thereof of angle change. Alternatively, or additionally the compensation may be fully step based such as by diminishing SNR by 1.5 dB for each full 10° of angle change, discarding any additional angles that are not part of a full step. Alternatively or additionally, the compensation may be based on a starting absolute angle and ending absolute angle. For example, more diminishing will likely be needed when changing from a 45° attitude to a 90° attitude than from a 0° attitude to a 45° attitude. Note also that the diminishing may be different depending on the number of axes experiencing a change in attitude. For example, while the example illustrated in FIG. 1C illustrates a change in roll, it should be appreciated that in other embodiments a change in pitch and/or a change in roll may occur. Note that typically changes in heading, in some embodiments, can be ignored inasmuch as heading can rarely be changed at a sufficient rate to cause the deleterious effects described previously herein. However, in embodiments where heading can be changed at a sufficient rate to cause deleterious effects, those changes in heading can also be factored into determining the magnitude of diminishing for changes in attitude.

As noted previously, in some embodiments, the amount that the target SNR is increased may be the same amount that the measured SNR is diminished.

Also note that while a single remote node is illustrated, it should be appreciated that in other embodiments, multiple remote nodes may be implemented in a given example, and the selection of the amount to increase the target SNR and cause the remote node to compensate for attitude change, such as by diminishing the measured SNR or requesting a higher SNR, may include a multi-variate approach. For example, in some embodiments, the amount to increase the target SNR to add link margin and cause the remote node to compensate for attitude change may be performed in a fashion to ensure that no links are lost. Alternatively, the amount to increase the target SNR and cause the remote node to compensate for attitude change may be performed to ensure that certain more prioritized links are not lost, while allowing other less prioritized links to be lost. Thus, certain remote nodes can be grouped into different groups for determining the amount to increase the target SNR and cause the remote node to compensate for attitude change. Note that when there are multiple remote nodes, each remote node will have its own measured SNR from the local node. The amount of measured SNR diminished or the amount of requested increase in SNR can be different per remote node. Further, each remote interval may be different so the amount of attitude change since the remote node received data from the local node could be different.

Some embodiments may include additional message tagging of outgoing messages in the forward data with an identifier (which in some embodiments, may be a sequence number) by the local node 102, and the remote node 104 returning the identifier in the forward PAR feedback message 108.

Further, the local node 102 can keep track of how much excess link margin was applied and how much compensation was caused by remote nodes in a PAR history. For example, in some embodiments, for each change in attitude being compensated for, an identifier is correlated, in a table or similar structure, with transmit power (in dBm) of transmitted data in the forward data 106, rate (in kbps) in the data in the forward data 106, a roll angle (in degrees) of the change in attitude, and a pitch angle (in degrees) of the change in attitude. Note that roll angles and pitch angles can be stored as absolute values or as changes in value from a previous value. In one particular embodiment, up to 16 values are stored for each remote node in the PAR history.

As feedback messages are received by the local node 102, embodiments determine which nodes have reacted to the increased link margin. The local node 102 can then efficiently manage how much excess link margin is needed during the uncertainty of platform dynamics caused by subsequent changes in attitude. Thus, each remote node will provide feedback that maps to an entry in the PAR history.

Thus, in summary, embodiments efficiently manage link margin on both the transmit and the receive side of the link during periods of platform dynamics, using a feedback method that is individualized for each of the neighboring nodes. Embodiments make efficient use of link resources (power and rate) during periods of platform dynamics without affecting performance during nominal operating conditions. Embodiments manage the responses from each neighbor in order to manage how much link margin should be maintained in the turn. Once neighbor nodes have caught up with the dynamics (e.g. steady roll angle in the turn or steady operation after a turn), the link margin is removed. In particular, as noted above, the local node 102 receives feedback from the remote node 104 indicating that messages from the local node 102 were heard while in the turn or after completion of a turn. When this occurs, the local node 102 removes the SNR boost from the target SNR and reverses the results of causing a remote node 104 to compensate for an attitude change in the local node 102 and resumes normal operation.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
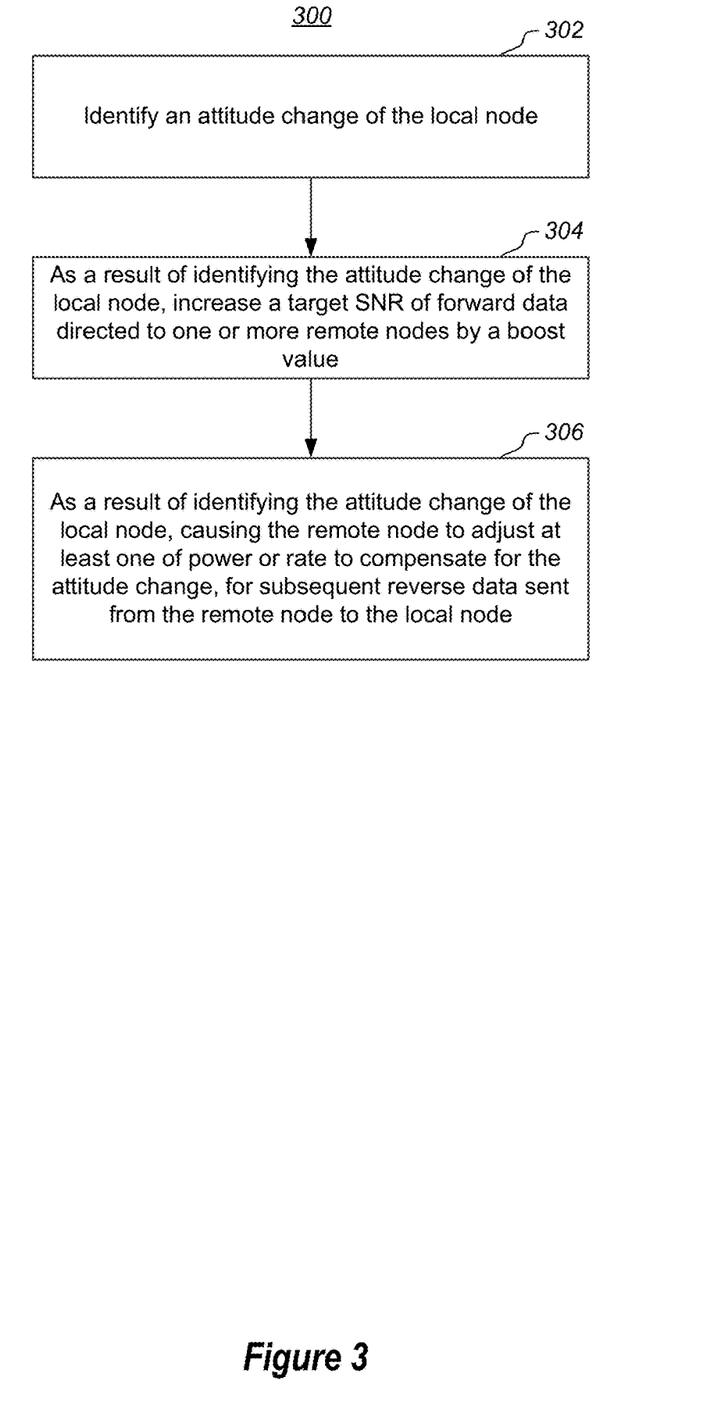
FIG. 3 illustrates a method of compensating for antenna gain losses due to attitude changes of a local node.

Referring now to FIG. 3, a method 300 is illustrated. The method 300 may be practiced in a network environment where one or more nodes in the network comprise mobile nodes. The method 300 includes acts for compensating for antenna gain losses due to attitude changes of a local node.

The method 300 includes, at the local node, identifying an attitude change of the local node (act 302).

The method 300 further includes, as a result of identifying the attitude change of the local node, increasing a target SNR of forward data directed to one or more remote nodes by a boost value (act 304).

The method 300 further includes as a result of identifying the attitude change of the local node, causing the remote node to adjust at least one of power or rate to compensate for the attitude change, for subsequent reverse data sent from the remote node to the local node (act 306). In some embodiments, this may be accomplished by diminishing, by a diminishing value, the value of SNR measured by the local node of data for reverse data sent to the local node from a remote node to create a diminished SNR feedback message and providing the diminished feedback message to the remote node. In an alternative embodiment, this may be accomplished by the local node specifying a new target SNR to the remote node for the target node.

The method 300 may be practiced where the boost value and diminishing value are based on communications between a plurality of remote nodes and the local node.

The method 300 may further include resuming normal operations by reducing the target SNR and preventing SNR feedback messages from being diminished due to attitude changes. For example, resuming normal operations is performed as a result of being at a steady attitude in a turn. Alternatively or additionally, resuming normal operations is performed as a result of having completed a turn.

The method 300 may be practiced where the attitude change is based on a change of roll angle. Alternatively or additionally, the method 300 may be practiced where the attitude change is based on a change of pitch angle.

The method 300 may further include storing a history of how much target SNR is boosted and how much SNR is diminished in diminished SNR feedback messages.

The method 300 may further include sending an identifier corresponding to the increased target SNR to the remote node, and receiving feedback including the identifier from the remote node.

The method 300 may be practiced where the magnitudes of the boost value and diminishing value are based on the values of angles in the attitude change.

The method 300 may be practiced where the magnitudes of the boost value and diminishing value are the same.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network environment, where one or more nodes in the network comprise mobile nodes, a method of compensating for antenna gain losses due to attitude changes of a local node, the method comprising:
   at the local node, identifying an attitude change of the local node;
   as a result of identifying the attitude change of the local node, increasing a target SNR of forward data directed to one or more remote nodes by a boost value; and
   as a result of identifying the attitude change of the local node, causing the remote node to adjust at least one of power or rate to compensate for the attitude change, for subsequent reverse data sent from the remote node to the local node.

2. The method of claim 1, wherein causing the remote node to adjust at least one of power or rate to compensate for the change in attitude:
   diminishing, by a diminishing value, a value of SNR measured by the local node of data for reverse data sent to the local node from a remote node to create a diminished SNR feedback message; and
   providing the diminished feedback message to the remote node.

3. The method of claim 2, wherein the boost value and diminishing value are based on communications between a plurality of remote nodes and the local node.

4. The method of claim 1, further comprising resuming normal operations by reducing the target SNR and preventing SNR feedback messages from being diminished due to attitude changes.

5. The method of claim 4, wherein resuming normal operations is performed as a result of being at a steady attitude in a turn.

6. The method of claim 4, wherein resuming normal operations is performed as a result of having completed a turn.

7. The method of claim 1, wherein the attitude change is based on a change of roll angle.

8. The method of claim 1, wherein the attitude change is based on a change of pitch angle.

9. The method of claim 1, further comprising storing a history of how much target SNR is boosted.

10. The method of claim 1, further comprising sending an identifier corresponding to the increased target SNR to the remote node, and receiving feedback including the identifier from the remote node.

11. The method of claim 1, wherein the magnitude of the boost value diminishing value is based on the values of angles in the attitude change.

12. The method of claim 2, wherein the magnitudes of the boost value and diminishing value are the same.

13. A mobile node for use in a network, the mobile node comprising:
   a navigation system configured to determine attitude of the mobile node;
   an antenna having a particular antenna gain pattern that changes with respect to the attitude of the mobile node;
   communication hardware coupled to the antenna and to the navigation system, wherein the communication system is configured, as a result of determining a change in attitude by the navigation system, to:
      increase a target SNR of forward data directed to one or more remote nodes by a boost value;
      diminish, by a diminishing value, the value of SNR measured by the local node of data for reverse data sent to the local node from a remote node to create a diminished SNR feedback message; and
      provide the diminished feedback message to the remote node, causing the remote node to adjust at least one of power and rate to compensate for the attitude change, for subsequent reverse data sent from the remote node to the local node.

14. The mobile node of claim 13, wherein the boost value and diminishing value are based on communications between a plurality of remote nodes and the local node.

15. The mobile node of claim 13, wherein the change in attitude is based on a change of roll angle.

16. The mobile node of claim 13, wherein the change in attitude is based on a change of pitch angle.

17. The mobile node of claim 13, further comprising storage for storing a history of how much target SNR is boosted and how much SNR is diminished in diminished SNR feedback messages.

18. The mobile node of claim 13, wherein the communication hardware is configured to send an identifier corresponding to the increased target SNR to the remote node, and receive feedback including the identifier from the remote node.

19. The mobile node of claim 13, wherein the magnitudes of the boost value and diminishing value are based on the values of angles in the change of attitude.

20. The mobile node of claim 13, wherein the magnitudes of the boost value and diminishing value are the same.

21. A system comprising:
   one or more processors; and
   one or more computer-readable media having stored thereon instructions that are executable by the one or more processors to configure the computer system to compensate for antenna gain losses due to attitude changes of a local node, including instructions that are executable to configure the computer system to perform at least the following:

at the local node, identifying an attitude change of the local node;

as a result of identifying the attitude change of the local node, increasing a target SNR of forward data directed to one or more remote nodes by a boost value; and as a result of identifying the attitude change of the local node, causing the remote node to adjust at least one of power or rate to compensate for the attitude change, for subsequent reverse data sent from the remote node to the local node.

\* \* \* \* \*